United States Patent
Baum et al.

(10) Patent No.: US 10,609,009 B2
(45) Date of Patent: *Mar. 31, 2020

(54) EXTENDED JAVASCRIPT OBJECT NOTATION FILE GENERATOR CIRCUITRY AND PROCESS

(71) Applicant: TEXAS INSTRUMENTS INCORPORATED, Dallas, TX (US)

(72) Inventors: Avraham Baum, Giva't Schmuel (IS); Ilan Zarmi, Hod-Hasharon (IS); Gil Reiter, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/822,455

(22) Filed: Nov. 27, 2017

(65) Prior Publication Data

US 2018/0077129 A1 Mar. 15, 2018

Related U.S. Application Data

(62) Division of application No. 14/611,080, filed on Jan. 30, 2015, now Pat. No. 9,853,956.

(Continued)

(51) Int. Cl.
*H04L 29/06* (2006.01)
*G06F 9/448* (2018.01)
(Continued)

(52) U.S. Cl.
CPC .......... *H04L 63/061* (2013.01); *G06F 9/4488* (2018.02); *G06F 9/45529* (2013.01);
(Continued)

(58) Field of Classification Search
CPC ............. H04L 63/0442; H04L 63/0823; H04L 63/123; H04L 9/08; H04L 9/0825;
(Continued)

(56) References Cited

U.S. PATENT DOCUMENTS

| 8,291,230 B2 | 10/2012 | Moore et al. |
| 2010/0185862 A1* | 7/2010 | Moore ...................... H04L 9/08 713/171 |

(Continued)

FOREIGN PATENT DOCUMENTS

| CN | 1552026 A | 12/2004 |
| CN | 101101602 A | 1/2008 |

(Continued)

OTHER PUBLICATIONS

Chinese Search Report dated May 16, 2018.

(Continued)

*Primary Examiner* — Azizul Choudhury
(74) *Attorney, Agent, or Firm* — Lawrence J. Bassuk; Charles A. Brill; Frank D. Cimino

(57) ABSTRACT

Methods and apparatus to provide extended object notation data are disclosed. An example apparatus includes a data handler having a first input to receive object data and a first output to output an object notation key-value pair for the object data; a string processor having a second input coupled to the first output and a second output to convey the object notation key-value pair without string literals; and a hashing and encryption handler having a third input coupled to the second output and a third output to convey the key-value pair signed with a private key, to convey the key-value pair encrypted with a public key, and to convey an indication that the encrypted key-value pair is encrypted in a key of the encrypted key-value pair.

20 Claims, 7 Drawing Sheets

Related U.S. Application Data

(60) Provisional application No. 61/938,381, filed on Feb. 11, 2014.

(51) Int. Cl.
  *G06F 16/00* (2019.01)
  *G06F 9/455* (2018.01)
  *G06F 21/62* (2013.01)
  *H04L 9/08* (2006.01)
  *H04L 9/32* (2006.01)

(52) U.S. Cl.
  CPC .......... *G06F 16/00* (2019.01); *G06F 21/6227* (2013.01); *H04L 9/08* (2013.01); *H04L 9/0825* (2013.01); *H04L 9/3236* (2013.01); *H04L 9/3247* (2013.01); *H04L 9/3263* (2013.01); *H04L 63/0442* (2013.01); *H04L 63/0823* (2013.01); *H04L 63/123* (2013.01); *H04L 2209/30* (2013.01); *H04L 2463/061* (2013.01); *H04L 2463/062* (2013.01)

(58) Field of Classification Search
  CPC ... H04L 9/3236; H04L 9/3247; H04L 9/3263; H04L 2209/30; H04L 63/061; H04L 63/062; G06F 9/4488; G06F 9/45529; G06F 1/00; G06F 21/6227
  See application file for complete search history.

(56) References Cited

U.S. PATENT DOCUMENTS

| 2010/0185869 | A1* | 7/2010 | Moore | ................. | H04L 9/3236 713/179 |
|---|---|---|---|---|---|
| 2014/0052993 | A1 | 2/2014 | Isozaki et al. | | |

FOREIGN PATENT DOCUMENTS

| CN | 101661391 A | 3/2010 |
|---|---|---|
| CN | 101854371 A | 10/2010 |
| CN | 101925895 A | 12/2010 |
| CN | 102053994 A | 5/2011 |
| CN | 102207873 A | 10/2011 |
| CN | 102479130 A | 5/2012 |
| CN | 102622448 A | 8/2012 |
| CN | 102750268 A | 10/2012 |
| CN | 102981841 A | 3/2013 |
| CN | 103064720 A | 4/2013 |
| CN | 103077185 A | 5/2013 |
| CN | 103379127 A | 10/2013 |
| WO | 2013096887 | 6/2013 |
| WO | 2013096887 A1 | 6/2013 |

OTHER PUBLICATIONS

El-Aziz et al.: "JSON encryption", 2014 International Conference on Computer Communication and Informatics, IEEE, Jan. 3, 2014, Coimbatore, India, IEEE, pp. 1-6, (pp. 2 and 5; figures 2, 6).

Wikipedia: "Digital signature—Wikipedia", Dec. 24, 2013, Retrieved from URL:https://en.wikipedia.org/w/index.php?title=Digital_signature&oldid=587491074, (p. 3-p. 4).

Supplementary European Search Report, PCT/US2015015515, dated Jul. 14, 2017.

Texas Instruments Incorporated, "CC3100 Simplelink Wi-Fi and Internet-of-Things Solution for MCU Applications," Jun. 2013—Revised Jun. 2014, 43 pages.

Texas Instruments Incorporated, "CC3200 Simplelink Wi-Fi and Internet-of-Things Solution, A Single-Chip Wireless MCU," Jul. 2013—Revised Jun. 2014, 71 pages.

* cited by examiner

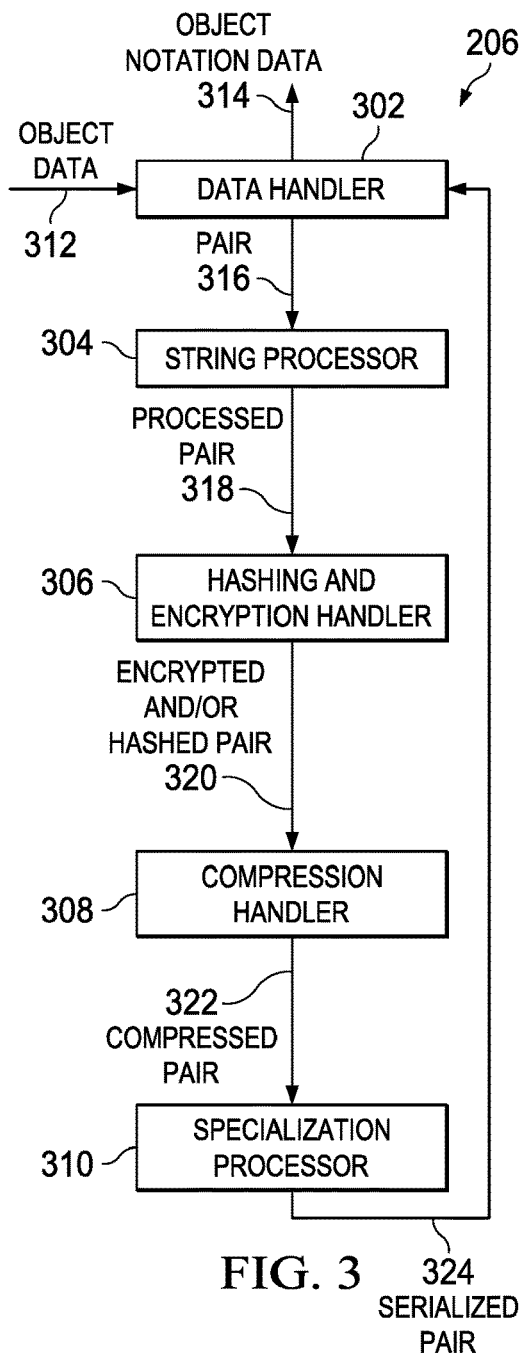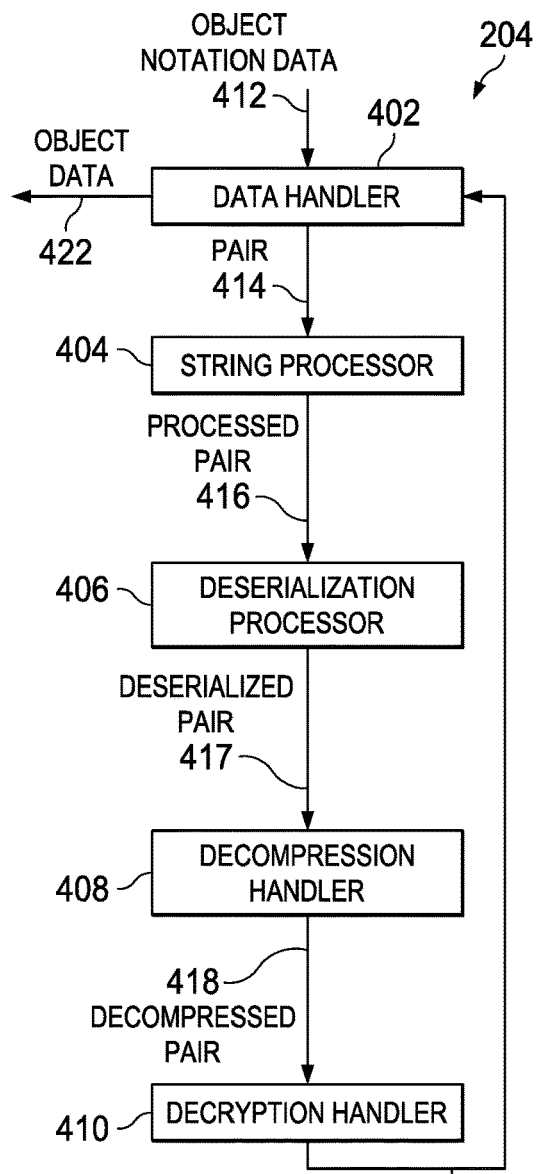
FIG. 3
FIG. 4

EXTENDED JAVASCRIPT OBJECT NOTATION FILE GENERATOR CIRCUITRY AND PROCESS

RELATED APPLICATION

This application is a divisional of prior application Ser. No. 14/611,080, filed Jan. 30, 2015, now U.S. Pat. No. 9,853,956, issued Dec. 26, 2017.

This patent claims priority to U.S. Provisional Patent Application Ser. No. 61/938,381, filed Feb. 11, 2014. The entirety of U.S. Provisional Patent Application Ser. No. 61/938,381 is hereby incorporated herein by reference.

FIELD OF THE DISCLOSURE

This disclosure relates generally to object notation data and, more particularly, to methods and apparatus to provide extended object notation data.

BACKGROUND

In network communications (e.g., Internet communications) it is often beneficial to utilize a communication standard that utilizes human-readable text. Such communication standards are often easier for programmers to understand and may be more flexible than application specific binary formats. One example communication standard that utilizes human-readable text is JavaScript Object Notation (JSON). JSON is well-suited for Internet communications because of its close ties to JavaScript, which is supported out-of-the-box by many Internet browsers and other applications.

BRIEF DESCRIPTION OF THE DRAWINGS

FIG. 3 is a block diagram of an example implementation of the example generator of FIG. 2.

FIG. 4 is a block diagram of an example implementation of the example parser of FIG. 2.

The figures are not to scale. Wherever appropriate, the same reference numbers will be used throughout the drawing(s) and accompanying written description to refer to the same or like parts.

DETAILED DESCRIPTION

Figure 1:
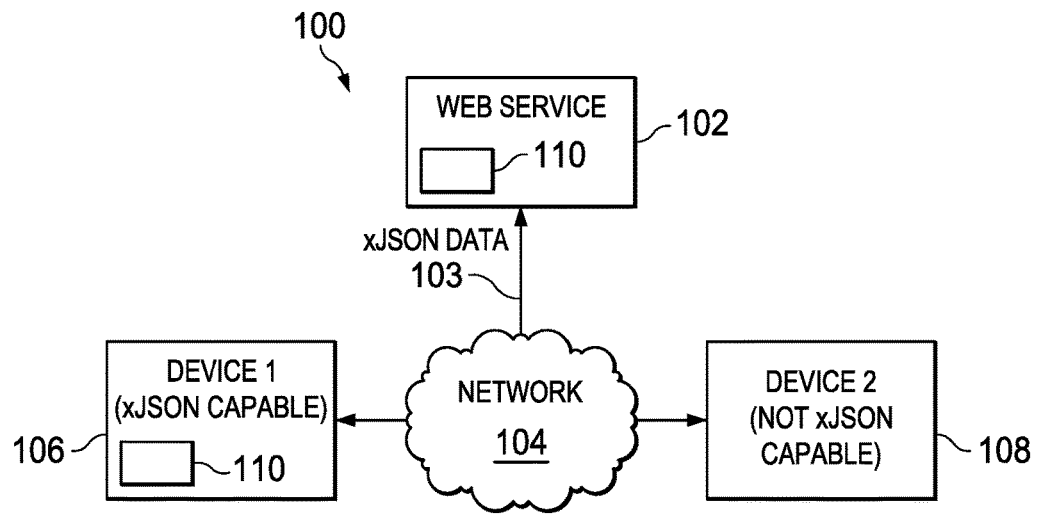
FIG. 1 is a block diagram of an example environment in which example methods and apparatus disclosed herein may be implemented to generate and/or parse xJSON and/or any other human-readable object notation data files.

The Internet of Things (IoT) refers to the concept of joining a wide range of devices to the Internet. The "things" may be any type of device or system, which often includes many devices that have previously not included circuitry capable of communicating on a network such as the Internet (e.g., consumer appliances, automobiles, biomedical devices, power outlets, thermostats and/or other environmental sensors, etc.). For example, a coffee maker may include an embedded computing device that allows the coffee maker to be uniquely identified on the Internet and allows remote control and monitoring of the example coffee maker via other Internet connected devices. Many IoT devices include low-cost and/or low-power computing devices to reduce the cost and physical space needed to add IoT functionality.

While JSON and other standards utilizing human-readable text for storing and transmitting data objects (e.g., Extensible Markup Language (XML), Yet Another Markup Language (YAML), etc.) (collectively object notation data) are well-suited for use with devices communicating on the Internet, example methods and apparatus disclosed in this application provide extensions to such human-readable formats to facilitate the use of the human-readable protocols with limited-resource devices such as IoT devices. This is advantageous because the disclosed methods and apparatus facilitate use of the desirable object notation data formats with IoT devices and/or any other device that has limited computing resources and/or communicates with many diverse devices.

While the extensions disclosed herein are well-suited for use with IoT devices, the extensions are not limited to use with and/or by IoT devices. Examples disclosed herein are described with reference to an extended JSON, which is referred to herein as xJSON for consistency. Alternatively, the extended JSON may be utilized with any other content type name and/or the extensions may be utilized with an extended version of any other protocol or standard. The methods and apparatus disclosed herein at not limited to extending JSON. Rather, the extensions may be utilized with any type of human-readable based protocol for storing and transmitting objects.

In JSON, objects are denoted by an array of key-value pairs delimited with opening and closing curly brackets. A key denotes a property of the object and the value identifies the value for that property. Keys and values are separated by a colon. For example, a person object in JSON may be stored in a file as:

```
{
  "firstName":"John",
  "lastName":"Smith",
  "email":"john.smith@example.com",
  "password":"secretPassword123)"
}
```

In the above example, firstName, lastName, email, and password are keys and John, Smith, john.smith@example.com, and secretPassword123 are values. The keys in the object may be referred to as names and may correlate with variables that store the values when the object is stored in an application (e.g., a person object in a JavaScript application). Thus, the JSON object provides a way to represent an object stored in binary or any other format in a human readable format.

The example extensions described herein include data packing, object serialization, and hashing/security.

As used herein, data packing refers to applying a compression algorithm to keys and/or values (e.g., compressing the keys and/or value using GNU Zip (gzip)). When a xJSON file is received, packed data in the xJSON file may be identified and decompressed.

As used herein, object serialization refers to converting keys and/or values to a binary value(s). In some examples, the binary value(s) are then converted to a text format (e.g., using Base64 binary-to-text encoding). When a xJSON file is received, serialized data in the xJSON file may be detected and deserialized/unmarshalled.

In some examples, hashing/security operations are performed by generating a hash for a value of a key-value pair and inserting the hash into the key. The hash can be used for validating the contents of the value by comparing the hash stored in the key with a hash generated for the value of the key-value pair. The hash may additionally or alternatively be used for searching for data contained in values. For example, a search parameter can be hashed and the hash for the search parameter can be compared with the hashes stored in keys to identify a match and, therefore, a value of a key-value pair that matches the search parameter. Additionally or alternatively, hashing/security may also include encrypting keys and/or values and replacing the unencrypted keys and/or values with the encrypted data. When a xJSON file is received, encrypted data in the xJSON file may be detected and decrypted.

In example methods and apparatus disclosed herein, in applying the disclosed extensions to JSON, xJSON capable devices insert a qualifier in a key and/or value when the key and/or the value have been generated and/or modified based on xJSON extensions. The qualifier indicates to other xJSON capable devices that the xJSON extension has been applied. For example, a key may be modified by adding brackets to the end of the key and inserting a qualifier (e.g., a qualifier indicating a particular extension that has been applied) in the brackets. For example, if an extension associated with the character "x" is applied to key-value pairs in the person object shown in the previous paragraph, the xJSON representation may be:

```
{
  "firstName[x]":"John",
  "lastName[x]":"Smith",
  "email[x]":"john.smith@example.com"
  "password[x]":"secretPassword123)"
}
```

The qualifier may alternatively be inserted between brackets added to the value of the key-value pair (e.g., "firstName":"John[x]") and/or qualifier(s) may be added to both the key and the value (e.g., "firstName[x]":"John[y]", "firstName[x]": {x; "v": "John"}, etc.). Alternatively, delimiters other than brackets may be utilized to separate the identifier from the key and/or value (e.g., curly braces, single quotation marks, quotation marks, asterisks, etc.).

For consistency the example disclosed herein are described with reference to xJSON identifiers inserted between brackets in the key of key-value pairs. However, this disclosure is not limited to a particular format for the insertion of the identifiers and any other format, including those described above, may be utilized.

The insertion of the identifier in the key name and/or value ensures that the xJSON representation can still be processed by a device that supports JSON but does not support xJSON (e.g., in some examples, using the xJSON techniques will not prevent devices that utilize JSON but do not support xJSON from parsing the xJSON file because the xJSON identifiers are inserted in a manner that is consistent with the JSON grammar). Accordingly, the use of xJSON will not cause devices that support JSON, but not xJSON, to fail during parsing of an xJSON file. Rather, these non-xJSON devices will continue to operate, but without an understanding of the extensions. Such an approach enhances the ability for xJSON capable devices to operate in an environment in which some devices do not support xJSON.

An additional advantage of inserting the identifier in the key as disclosed herein allows xJSON extensions to be applied on a selective basis. For example, an xJSON extension may be applied to an entire file, may be selectively applied to one or more objects in a file, may be selectively applied to one or more keys-value pairs in a file, etc. Thus, when the xJSON file is being processed, key-value pairs that include an xJSON identifier in the key can be processed according to the extension and key-value pairs that do not include an xJSON identifier in the key can be processed using standard JSON processing. Furthermore, different ones of the extensions can be applied to subsets of the key-value pairs in a file. For example, in the foregoing example (1) "person" object, the firstName, lastName, and email key-value pairs may be processed to insert a hash value and an xJSON identifier for hashing in the corresponding keys, (2) the password key-value pair may be encrypted and hashed, (3) and an encryption identifier, a hash identifier, and a hash value may be inserted in the corresponding key.

FIG. 1 is a block diagram of an example environment 100 in which example methods and apparatus disclosed herein may be implemented to generate and/or parse xJSON and/or any other human-readable object notation data files. The example environment includes an example web service 102 to convey an example xJSON data 103 via an example network 104 to an example first device 106 and an example second device 108. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example, the example web service 102, the example first device 106, and the example second device 108 exchange data using JSON data files. According to the illustrated example, the example web service 102 and the example first device 106 are xJSON capable in that they include an xJSON handler 110 to parse and/or generate files that are based on at least one of the extensions associated with xJSON disclosed herein. According to the illustrated example, the example second device 108 is not xJSON capable in that the example second device 108 may parse and/or generate JSON files but does not include the xJSON handler 110 for parsing and/or generating xJSON files with the extensions associated with xJSON disclosed herein. As disclosed herein, while the example second device 108 is not capable of utilizing the extensions related to xJSON, the example xJSON data 103 of the illustrated example that is output by the example web service 102 and/or the example first device 106 may be successfully parsed (e.g., parsed without causing a parsing error).

In the illustrated example, the web service 102 is a server computer for serving information on the Internet. Alternatively, the web service 102 may be any type of device with which a device connected to the example network 104 may communicate. The example web service 102 sends the example xJSON data 103 to the example first device 106 and/or the example second device 108. The example web service 102 may also receive xJSON data from the example first device 106 and/or JSON data from the example second device 108. Alternatively, the example web service 102 may only be capable of receiving data (e.g., xJSON data and/or JSON data) or may only be able of sending data (e.g., the xJSON data 103 and/or JSON data).

The network 104 of the illustrated example of FIG. 1 is the Internet. Alternatively, the network 104 may be any type of and/or combination of a local area network, a wide area network, a wired network, a wireless network, a private network, a public network, etc. The example network 104 communicatively couples the example web service 102 with the example first device 106 and the example second device 108.

The first device 106 of the illustrated example of FIG. 1 is an IoT device that includes the example xJSON handler 110 to parse and/or generate the example xJSON data 103. For example, the first device 106 may be a network-enabled microprocessor controller. For example, the first device 106 may be the CC3100 SimpleLink™ Wi-Fi® and Internet-of-Things Solution for MCU Applications or the CC3200 SimpleLink™ Wi-Fi® and Internet-of-Things Solution, a Single-Chip Wireless MCU from Texas Instruments® and/ or a device that includes the CC3100 or the CC3200. Alternatively, the first device 106 may be any other device in which it is desirable to utilize JSON data.

The second device 108 of the illustrated example of FIG. 1 may be any device in which it is desirable to utilize JSON data. The second device 108 is included in the example of FIG. 1 to illustrate that devices that support xJSON extensions (e.g., the example web service 102 and the example first device 106) and devices that do not support xJSON extensions may be connected to the same network and may communicate with each other. For example, when xJSON extensions are implemented in a manner that does not run afoul of the JSON grammar, JSON files (e.g., the example xJSON data 103) that include at least some key-value pairs that include xJSON extensions (e.g., xJSON files) can be parsed by devices that do not support xJSON without causing parsing errors. Likewise, devices that support xJSON extensions are able to process JSON files.

The example xJSON handler 110 parses and/or generates xJSON files (e.g., files that are generated according to the JSON protocol and include at least one key-value pair that includes one of the xJSON extensions disclosed herein such as the example xJSON data 103). An example implementation of the xJSON handler 110 is described in further detail in conjunction with FIG. 2. While FIG. 1 illustrates that the example web service 102 and the example first device 106 include the same xJSON handler 110, in other examples, devices may include different xJSON handlers (e.g., the xJSON handler 110 of the example web service 102 may be implemented differently than the xJSON handler 110 of the example first device 106).

Utilizing the xJSON handler 110 enables a device to generate xJSON data and parse xJSON data (e.g., object notation data that includes the extensions disclosed herein). The xJSON handler 110 of the illustrated example facilitates the use of data representations that are not supported by existing object notation protocols. For example, the xJSON handler 110 may support the use of customized primitives (e.g., primitives that are well-suited for use with embedded devices such as IoT devices). For example, a binary typed literal may be input as "0bAAAA" or "0BAAAA" where "b" and "B" indicate that the value is a binary literal. In another example, a hexadecimal typed literal may be input as "0xAAAA" or "0XAAAA" where "x" and "X" indicate that the value is a hexadecimal literal. Hardware based literals may also be supported by the xJSON handler 110. For example, an identifier may be added to a key and/or a value to indicate a literal of a volatile type, a literal for a hardware signal type (input, output, both), and a tri-state value for a signal object. In other words, the flexibility of utilizing identifiers appended to, inserted in, replacing portions of keys and/or values, etc. allows the xJSON handler 110 to indicate information about keys and/or values including indicating the state (e.g., encrypted, compressed, serialized, etc.) and/or the purpose of the value (e.g., a literal for a hardware signal type).

While the example environment 100 of FIG. 1 includes the example web service 102, the example first device 106, and the example second device 108, any number and/or types of devices may be utilized. For example, an environment might include any combination of two devices and/or web services, three devices and/or web services, four devices and/or web services, hundreds of devices and/or web services, etc.

Figure 2:
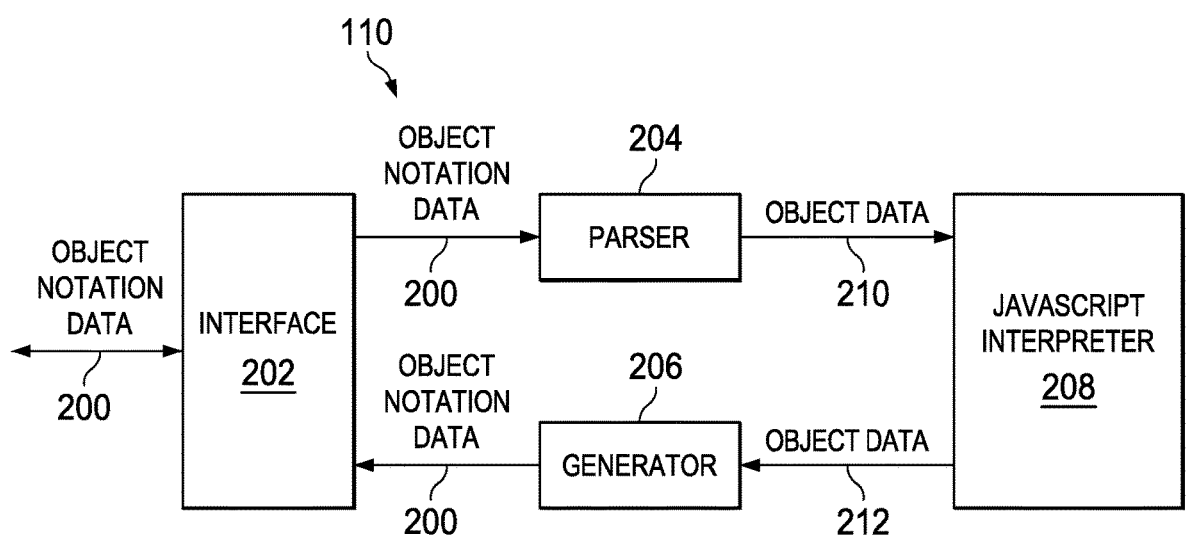
FIG. 2 is a block diagram of an example implementation of the example xJSON handler of FIG. 1.

FIG. 2 is a block diagram of an example implementation of the example xJSON handler 110 of FIG. 1. The example xJSON handler 110 of FIG. 2 includes an example interface 202 to send and/or receive example object notation data 200 (e.g., the example xJSON data 103), an example parser 204 to parse the example object notation data 200 to output example object data 210, an example generator 206 to generate example object notation data 200 from example object data 212, and an example JavaScript Interpreter 208. While the xJSON handler 110 of FIG. 2 is described with reference to the example first device 106, the xJSON handler 110 of FIG. 2 may be implemented in another device (e.g., the example web service 102).

The example interface 202 of the illustrated example is a network interface 202 that sends and/or receives the object notation data 200 (e.g., the example xJSON data 103) to and/or from the network 104 and/or from one or more other components of the device that includes a xJSON handler 110 (e.g., components of the example web service 102 and/or components of the example first device 106). For example, the xJSON handler 110 of the example first device 106 may receive the example xJSON data 103 retrieved from the example web service 102. The example interface 202 transmits the object notation data 200 received from the network 104 to the example parser 204. The example interface 202 transmits the object notation data 200 received from the example generator 206 to a desired destination for the object notation data 200. For example, the interface 202 for the xJSON handler 110 of the example first device 106 may transmit the example object notation data 200 generated by the example generator 206 to the example web service 102.

The parser 204 of the illustrated example receives the object notation data 200 and parses the data to extract the objects represented by the object notation data 200. The parser 204 transmits extracted object data 210 to the example JavaScript interpreter 208. For example, returning to the example person object discussed above, the parser 204 retrieves the elements of the person object from the key-value pairs included in the xJSON data (e.g., the firstName, the lastName, the email, and the password) and builds a JavaScript person object that is transmitted to the JavaScript interpreter 208. The example parser 204 includes functionality for parsing xJSON data that includes one or more of data packing, object serialization, and/or hashing/security extensions. An example implementation of the parser 204 is described in further detail in conjunction with the block diagram of FIG. 4.

The example generator 206 of the illustrated example builds object notation data 200 (e.g., an xJSON file) file to represent object data 212 received from the JavaScript interpreter 208. For example, the example generator 206 may build the example person object in xJSON based on a person object stored in the JavaScript interpreter. The object notation data 200 generated by the generator 206 is transmitted to the interface 202 for transmission to another device (e.g., the web service 102). Alternatively, the xJSON handler 110 and/or a device that includes the xJSON handler 110 may store the object notation data 200 (e.g., for later transmission and/or processing). The example generator 206 is described in further detail in conjunction with the block diagram of FIG. 3.

The JavaScript interpreter 208 of the illustrated example is a software run-time environment that operates according to the JavaScript programming language to execute JavaScript applications or any other JavaScript instructions. The example JavaScript interpreter 208 of the illustrated example stores object data 210 and/or 212 (e.g., the above-described person object). While the JavaScript interpreter 208 of the illustrated example utilizes JavaScript, the JavaScript interpreter 208 may alternatively be any other run-time environment that can receive objects output by the example parser 204 and/or transmit objects to the example generator 206.

FIG. 3 is a block diagram of an example implementation of the example generator 206 of FIG. 2. The example generator 206 of FIG. 3 includes an example data handler 302, an example string processor 304, an example hashing and encryption handler 306, an example compression handler 308, and an example serialization processor 310.

The example data handler 302 receives object data 312 (e.g., the example object data 212 received from the example JavaScript interpreter 208) and generates an object notation data 314 populated with xJSON key-value pairs representative of the object data 312. For example, the example data handler 302 may provide an interface (e.g., an Application Programming Interface (API)) through which a request for generation of an xJSON file may be received. The example data handler 302 determines if the request indicates that an xJSON file is to be generated or if a JSON file that includes xJSON extensions is to be generated. For example, as described in detail herein, if the object notation data 314 does not need to be compatible with devices that do not support xJSON, the object notation data 301 output by the generator 206 may be formatted to be processed by an xJSON capable device (e.g., the quotation marks that surround keys and values according to standard JSON grammar can be excluded when the example parser 204 will parse the file and implicitly evaluate the data without the presence of the quotation marks). The example data handler 302 of the illustrated example records the content type for the xJSON file, creates a key-value pair 316 (a single key-value pair is discussed, but a plurality of key-value pairs may be utilized) for the object data 312 (e.g., by creating a key named for the variable of the object data 312 and creating a corresponding value for the value of the variable), and sends and the key-value pair 316 to the example string processor 304.

The example string processor 304 of FIG. 3 determines if the content type for the object notation data 314 is to be xJSON or standard JSON. If the object notation data 314 is intended to be parsed by xJSON capable devices and non-xJSON capable devices, the string processor 304 inserts quotation marks around the keys and the values in the key-value pair 316. If compatibility with non-xJSON capable devices was not desired, the string processor 304 does not insert the quotation marks as the strings of the example key-value pair 316 will be implicitly recognized by xJSON capable parsers (e.g., the example parser 204 of FIG. 2). For example, the following example person object may be generated when non-xJSON compatibility is desired:

```
{
    "firstName": "John",
    "lastName": "Smith",
    "email": "john.smith@example.com",
    "password": "secretPassword123)"
}.
```

Alternatively, the following example person object may be generated when non-xJSON compatibility is not desired and/or needed:

```
{
    firstName: John,
    lastName: Smith,
    email: john.smith@example.com,
    password: secretPassword123)
}.
```

The example string processor 304 outputs a processed key-value pair 318 to the hashing and example encryption handler 306.

The example hashing and encryption handler 306 of FIG. 3 receives the processed key-value pair 318 and determines if hashing and/or encryption of the processed key-value pair 318 is requested. For example, the request to generate the object notation data 314 may identify one or more key-value pairs and/or objects for which hashing and/or encryption is requested. For example, if an object includes a username field and a password field, hashing may be requested for all fields but encryption may be requested for only the password field. Alternatively, the hashing and encryption handler 306 may automatically determine that hashing and/or encryption is desired (e.g., when a key-value pair is identified as sensitive data such as a password field).

When hashing and/or encryption are requested, the hashing and encryption handler 306 determines a desired cipher (e.g., an encryption cipher, a hashing cipher, a combination of an encryption cipher and a hashing cipher, etc.) to be used. For example, the request to perform hashing and/or encryption may identify a cipher and/or the example hashing and encryption handler 306 may utilize a default cipher.

To certify the authenticity of the processed key-value pair 318 to other devices, the hashing and encryption handler 306 of this example signs the processed key-value pair 318 utilizing a private key of the content-owner (e.g., the owner of the data for which the xJSON file is being generated) to generate an encrypted and/or hashed key-value pair 320. In such examples, the encrypted and/or hashed key-value pair 320 can be verified by others with access to the public key corresponding to the private key.

When the cipher includes encryption (e.g., as opposed to only including data signing), the example hashing and encryption handler 306 of FIG. 3 encrypts the encrypted and/or hashed key-value pair 320 for any key-value pairs for which encryption was requested. The example hashing and encryption handler 306 encrypts the encrypted and/or hashed key-value pair 320 using a public key corresponding to a private key that may be utilized to decrypt the encrypted and/or hashed key-value pair 320. For example, the parser 204 of FIGS. 2 and/or 4 may store a private key that may be utilized for decrypting data encrypted using a corresponding public key.

The example hashing and encryption handler 306 then hashes the encrypted and/or hashed key-value pair 320 (e.g., key-value pairs are hashed when hashing was requested). The example hashing and encryption handler 306 hashes the encrypted value for any encrypted data (as opposed to the original data prior to encryption).

The hashing and encryption handler 306 of the illustrated example inserts cipher keys data into the encrypted and/or hashed key-value pair 320 (e.g., inserts the data in an xJSON file) that is being generated. The cipher keys data identifies one or more keys that were utilized in encrypting the encrypted and/or hashed key-value pair 320. For example, the cipher keys data may include an identifier for a certificate for which a public key was used to encrypt the encrypted and/or hashed key-value pair 320 to enable the example parser 204 to locate the corresponding private key for use in decrypting the encrypted and/or hashed key-value pair 320. The cipher keys may additionally include an identifier for a certificate for which a private key was utilized for signing the data. Where multiple keys are utilized in a single xJSON file, each key may be identified with a sequential number in the cipher keys data. In addition to the identifier for the encryption key, the cipher keys data of the illustrated example also identifies the particular cipher algorithm used for the hashing and/or encryption and any parameters corresponding to the cipher algorithm.

In some examples, the hashing and encryption handler 306 also inserts the public key certificate(s) that were utilized for encrypting the encrypted and/or hashed key-value pair 320 and/or that may be utilized to validate the signing data in the encrypted and/or hashed key-value pair 320.

The example hashing and encryption handler 306 of the example of FIG. 3 inserts in the corresponding keys of the encrypted and/or hashed key-value pair 320 an indication of the hashing and/or an indication of the encryption. For example, for a key that has its value hashed, the example hashing and encryption handler 306 inserts '[#HHHH]' in the key, where '#' is a hash identifier and 'HHHH' is the value resulting from the hashing. The example hashing and encryption handler 306 inserts '[sX#HHHH]' in the key for the encrypted and/or hashed key-value pair 320, where the 's' is a hash identifier, the 'X' is an index value of the key utilized for the signing and/or encryption where there are multiple keys, the '#' is a hash identifier, and 'HHHH' is the value resulting from the hashing.

For example, the following is a person object before hashing and encryption:

```
{
"name": "John Smith",
"email": "john.smith@example.com",
"passwords": ["12345678", "my-most-secret-passphrase", "abcdefg"]
}
```

A hashed and encrypted person object that may be generated by the example hashing and encryption handler 306 of FIG. 3 for the person object above is:

```
{
"keys": [ { "id": "8707b206-669f-4eb8-b519-643c11c24e2a",
   "cipher": "ECDSA_SHA256",
      "param": { "type": "named-curve",
         "curve": "prime256v1" }
}];
"cert": [ .. public key certificates if necessary .. ]
"name[#b417]": "John Smith",
"email[#7c3d]": "john.smith@example.com",
"passwords[s#181f]":"MzA0NTAyMjEwMGQzNmYzY2EyZjJmNjc4YTRmMGEyNWVjO
DdhMDk1MjA4YTJhMjViZWRlZTRiYzFhZDdkNzIwNzU1NzMzMjYyNGEwMjIwNGY
wOWQxNzY1Y2MyMjkxNTM0ZDE5YWQ2NDE3ZjcxMmU1ZDZlMDliZDY0ODcyNTA
5ODA5MTBiZmU1NDc4MmZkNTZkYjcJM2UJMDYJMTgJYzYJMjYJMmEJOWIJZjIJN
mYJNTcJNTMJNzYJYTlJYmQNCmVlCTE0CTUyCWU4CWM3CTE1CWU4CWQ3CWQ
wCTQ0CTFhCTEzCWUwCWFlCTJlCTNhDQpjMQk3MQk5OQkxNwljNQk5OAk1Ygk4Y
wkxNQk4NAk1MAk5NgkzNwk0YgkzYQk3YQ=="
}
```

The example hashing and encryption handler 306 outputs the encrypted and/or hashed key-value pair 320 to the example compression handler 308.

The compression handler 308 of the illustrated example determines if compression of the encrypted and/or hashed key-value pair 320 is requested. For example, the request to generate the xJSON file may identify one or more key-value pairs and/or objects for which compression is requested. Alternatively, the compression handler 308 may automatically determine that compression is desired when a key-value pair and/or an object exceeds a threshold size. When compression is requested, the compression handler 308 compresses (e.g., zips) the encrypted and/or hashed key-value pair 320 (e.g., the requested key-value pair and/or the requested object) to generate the example compressed key-value pair 322. The example compression handler 308 of the illustrated example inserts a key for the compressed data in the example compressed key-value pair 322. For example, the compression handler 308 may insert a generated key for the compressed data (e.g., a key such as _oX, where X is a number that increments for each set of generated data inserted in the generated xJSON file) to ensure that the key for each set of generated data is unique. The example compression handler 308 of FIG. 3 also inserts a compression identifier (e.g., [z]) in the example compressed key-value pair 308 to indicate to the example parser 204 that the compressed key-value pair 308 is compressed. In the illustrated example, the example compression handler 308 inserts a value for the key that identifies metadata for the compression and includes the compressed data. For example, the compression handler 308 may utilize gzip for compressing the encrypted and/or hashed key-value pair 320 and may insert metadata identifying the algorithm and the look-up table for the compression algorithm. For example, the result of compressing the person object may be:

```
{
"_o1[z]": {
'alg': 'gzip',
'lut': '+srRõ'ós',
'o': xœËKÌMµÈÉÏES(ÍÍ,É°NÍMÍÌ
}
}
```

The example compression handler 308 outputs the compressed key-value pair 322 to the example serialization processor 310.

The example serialization processor 310 of the illustrated example determines if serialization of the example compressed key-value pair 322 is requested. For example, the request to generate an xJSON file may identify one or more key-value pairs and/or objects for which serialization is requested. When serialization is requested, the example serialization processor 310 serializes the requested compressed key-value pair (e.g., the requested key-value pair and/or the requested object) to generate an example serialized key-value pair 324. The serialization processor 310 of the illustrated example inserts a key for the serialized key-value pair 324. For example, the serialization processor 310 may insert a generated key for the serialized key-value pair 324 (e.g., _oX, where X is a number that increments for each set of generated data in the generated xJSON object notation data 314) to ensure that the key for each set of generated data is unique. The example serialization processor 310 also inserts a serialization identifier (e.g., [b]) in the key to indicate to the example parser 204 that the serialized key-value pair is serialized. The example serialization processor 310 of FIG. 3 inserts the serialized data as the value for the key of the serialized key-value pair 324. In the illustrated example, the example serialization processor 310 converts the binary data resulting from the serializing to ASCII text using Base64 conversion. For example, the result of serializing the person object may be:

```
{
"_o1[b]":
"NjTigJxuYW1l4oCdOiDigJxKb2huIFNtaXRo4oCdLA0K4oCcZW1haWzigJ06IO
KAnGpvaG4uc21pdGhAZXhtYXBsZS5jb23igJ0NCg=="
}
```

The example serialization processor 310 of the illustrated example transmits the resulting serialized key-value pair 324 to the example data handler 302 for transmission to the destination for the object notation data 314 (e.g., to the example web server 102 via the example interface 202 and the example network 104). For example, the object notation data 314ile may be transmitted via the example interface 202 to the example web service 102 for parsing by the example parser 204 in the xJSON handler 110 implemented in the example web service 102. The example web service 102 may then process the data objects in accordance with the operation of the example web service 102. Alternatively, the object notation data 314 may be transmitted to any other desired location. In some examples, the data handler 302 includes references to invoke functions in the object notation data 314. For example, a function referenced as "func1 (arg1, . . . argN)" will cause a parser (e.g., the example parser 204 to invoke the function identified as "func1" when parsing the object notation data. Alternatively, a function referenced as "@uri#func1(arg1, . . . argN)" will cause the parser (e.g., the example parser 204) to cause "func1" to be invoked by the server listening at the location "uri."

FIG. 4 is a block diagram of an example implementation of the parser 204 of FIG. 2. The example parser 204 of FIG. 4 includes a data handler 402, a string processor 404, a decryption handler 410, a deserialization processor 406, and a decompression handler 408.

The data handler 402 of the example of FIG. 4 receives an example object notation data 412 (e.g., an xJSON file) file to be processed. The example data handler 402 extracts the key-value pairs and/or objects from the object notation data 412 and transmits them to the example string processor 404. For example, the data handler 402 may extract one key-value pair at a time and transmit the key-value pair as the example key-value pair 414 for processing by the example string processor 404, the example deserialization processor 406, the example decompression handler 408, and/or the example decryption handler 410. Alternatively, the data handler 402 may extract multiple key-value pairs for processing by the example string processor 404, the example deserialization processor 406, and the example decompression handler 408, and the example decryption handler 410.

Following processing by one or more of the example string processor 404, the example deserialization processor 406, and the example decompression handler 408, and the example decryption handler 410, the example data handler 402 receives the data object(s) (e.g., the example decrypted pair 420) and transmits example object data 422 containing the objects extracted from the example object notation data 412 to the example JavaScript interpreter 208.

The example string processor 404 of FIG. 4 receives the example key-value pair(s) 414 extracted from the object notation data 412 (e.g., a xJSON file) by the data handler 402 and automatically determines if the example key-value pair 414 is an xJSON file or a JSON file based on the presence or lack of string literals (e.g., quotation marks surrounding the keys and values). According to the illustrated example, the string processor 404 determines that the example key-value pair 414 is associated with file is a JSON file when the string literals are present and determines that the example key-value pair 414 is an xJSON file when the string literals are not present. The example string processor 404 additionally removes the string literals (e.g., the quotation marks) when they are present to reduce the data size. The example string processor 404 transmits processed key-value pair(s) 416 to the example deserialization processor 406.

The example deserialization processor 406 of FIG. 4 determines if the processed key-value pair(s) 416 include a serialization identifier (e.g., a key that has been modified to include an indication that serialization has been performed such as the letter "b" in brackets). When the example deserialization processor 406 determines that the serialization identifier is included in the example processed key-value pair 416, the example deserialization processor 406 deserializes the example processed key-value pair 416. For example, serialized data may be encoded in Base64 and the example serialization processor 406 will decode the Base64 representation to retrieve the original key-value pair(s). After performing any needed deserialization, the example deserialization handler 406 of the illustrated example transmits a deserialized key-value pair(s) 417 to the example decompression handler 408.

The example decompression handler 408 determines if the example deserialized key-value pair(s) 417 include a compression identifier (e.g., a key that has been modified to include an indication that compression has been performed such as the letter "z" in brackets). When the example decompression handler 408 of this example determines that the compression identifier is included in a key of the example deserialized key-value pair 417, the example decompression handler 408 decompresses the example deserialized key-value pair 417. The example decompression handler 408 of the illustrated example retrieves the identity of the compression algorithm from metadata inserted into the value(s) of the example deserialized key-value pair 417 during compression by the example compression handler 308. For example, the metadata may include an identity of the compression algorithm (e.g., gzip), parameters for use during the compression and/or decompression (e.g., a look up table), etc. After performing any needed decompression, the example decompression handler 408 transmits a decompressed key-value pair(s) 418 to the example decryption handler 410.

The decryption handler 410 of this example determines if the decompressed key-value pair(s) 418 includes an encryption identifier (e.g., a key that has been modified to include an indication that encryption has been performed such as the letter "s" in brackets). When the decryption handler 410 of the illustrated example determines that the encryption identifier is included in a key of the example decompressed key-value pair 418, the decryption handler 410 decrypts the key-value pair. For example, the decryption handler 410 may have access to private keys installed on the device on which the xJSON handler 110 is implemented (e.g., the example first device 106). The decryption handler 410 of the illustrated example may retrieve the private key corresponding to decompressed key-value pair 418 and utilize the private key for decrypting the decompressed key-value pair 418. Alternatively, the decryption handler 410 may prompt a user to input a private key for performing the decryption.

The example decryption handler 410 of FIG. 4 determines the appropriate private key for the decryption by analyzing the keys field inserted into the decompressed key-value pair 418 and/or the example object notation data 412. Alternatively, information identifying the keys utilized for encrypting and/or decrypting the decompressed key-value pair(s) 418 may be stored in any other location (e.g., information about keys utilized for encryption may be inserted in the key of an encrypted key-value pair). In some examples where multiple keys are utilized in the example object notation data 412, the encryption identifier may include an identifier for the particular one of the keys utilized for encrypting (and similarly for decrypting) the decompressed key-value pair 418. For example, as described above in conjunction with the hashing and encryption handler 306, the encryption identifier may be "[sX#HHHH]" where X is an index value identifying one of the keys in the keys field inserted in the object notation data 412.

After performing any needed decryption, the example decryption handler 410 of the illustrated example transmits an example decrypted key-value pair(s) 420 to the data handler 402 for transmission of the example object data 422 to the example JavaScript interpreter 208.

While an example manner of implementing the generator 206 of FIG. 2 is illustrated in FIG. 3, one or more of the elements, processes and/or devices illustrated in FIG. 3 may be combined, divided, re-arranged, omitted, eliminated and/or implemented in any other way. Further, the example data handler 302, the example string processor 304, the example hashing and encryption handler 306, the example compression handler 308, the example serialization processor 310, and/or, more generally, the generator 206 of FIGS. 2 and 3 may be implemented by hardware, software, firmware and/or any combination of hardware, software and/or firmware. Thus, for example, any of the example data handler 302, the example string processor 304, the example hashing and encryption handler 306, the example compression handler 308, and/or the example serialization processor 310 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data handler 302, the example string processor 304, the example hashing and encryption handler 306, the example compression handler 308, and/or the example serialization processor 310 is/are hereby expressly defined to include a tangible computer readable storage device or storage disk such as a memory, a digital versatile disk (DVD), a compact disk (CD), a Blu-ray disk, etc. storing the software and/or firmware. Further still, the xJSON handler 110 of FIG. 1 and/or the generator 206 of FIGS. 2 and/or 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the example generator 206 are shown in FIGS. 5-8. In these examples, the machine readable instructions comprise program(s) for execution by a processor such as the processor 1212 shown in the example processor platform(s) 1200 discussed below in connection with FIG. 12. The program(s) may be embodied in software stored on a tangible computer readable storage medium such as a CD-ROM, a floppy disk, a hard drive, a digital versatile disk (DVD), a Blu-ray disk, or a memory associated with the processor(s) 1212, but the entire program(s) and/or parts thereof could alternatively be executed by a device other than the processor(s) 1212 and/or embodied in firmware or dedicated hardware. Further, although the example program(s) are described with reference to the flowcharts illustrated in FIGS. 5-8, many other methods of implementing the example generator 206 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 5:
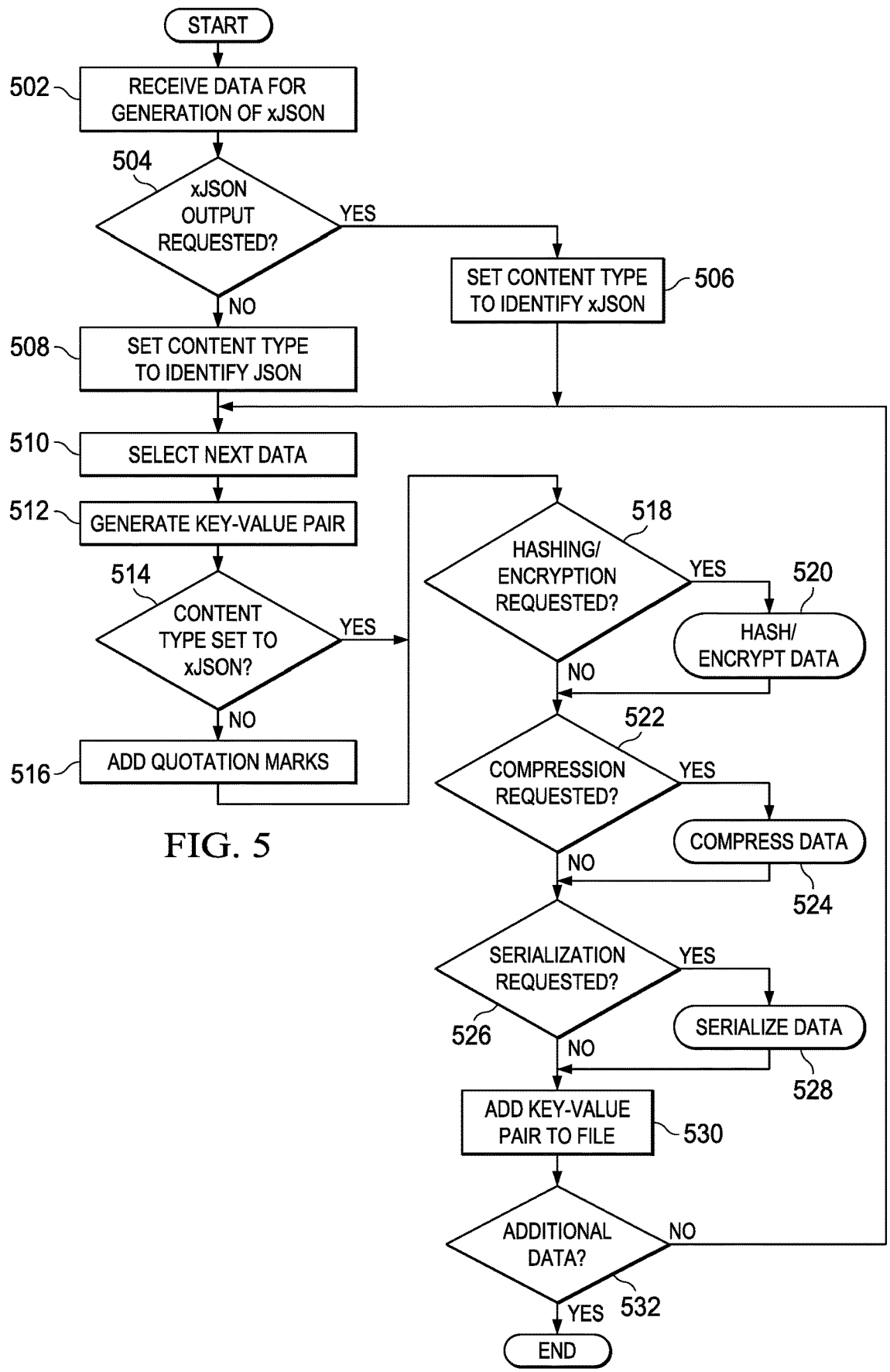
FIGS. 5-8 are flowcharts representative of an example computer readable instructions that may be performed to generate extended JSON data.

The example computer readable instructions of FIG. 5 begins when the example data handler 302 receives data and a request to generate object notation data (e.g., an xJSON file) (block 502). For example, the example data handler 302 may receive a JavaScript object from the example JavaScript interpreter 208. The example data handler 302 determines if xJSON output is requested (block 504). For example, the request to generate the xJSON file may include an indication that an xJSON specific file is requested. An xJSON specific file is a file that does not need to support parsing by devices that do not support xJSON. For example, for files that support parsing by JSON the keys and values are surrounded by quotation marks and for xJSON files that do not need to support JSON the keys and values do not need to be surrounded by quotation marks to reduce the file size. When the request indicates that the output file is to be an xJSON file type, the example data handler 302 inserts a content type identifier indicating that the file is an xJSON file type (e.g., "Content-Type: application/xjson") (block 506). When the request indicates that the output file is to be a JSON file type, the example data handler 302 inserts a content type identifier indicating that the file is a JSON file type (e.g., "Content-Type: application/json") (block 508).

After the content type is set in block 506 or block 508, the example data handler 302 selects a data object (e.g., selects a first data object, a first element of a data object, a next data object, etc.) (block 510). For example, the example data handler 302 may select the firstName element of the example person object described above. The example data handler 302 then generates a key-value pair for the selected element (block 512). For example, the example data handler 302 may create a key named "firstName" and a value containing the value for the firstName element to generate the JSON key-value pair: "firstName: John."

The example string processor 304 then determines if the content type was set to xJSON for the file (block 514). If the content type was not set to xJSON (e.g., the output file is to support parsing by JSON parsers that do not support xJSON), the example string processor 304 inserts quotation marks around the key and the value in the generated key-value pair (block 516).

After the string processor 304 inserts the quotation marks in block 516 or after the string processor 304 determines that the content type for the file is set to xJSON (block 514), the example hashing and encryption handler 306 determines if the key-value pair is to be hashed and/or encrypted (block 518). The example hashing and encryption handler 306 may determine that the key-value pair is to be hashed and/or encrypted when the request to generate the xJSON file indicates that the key-value pair is to be hashed and/or encrypted. Alternatively, the hashing and encryption handler 306 may automatically determine that data is to be encrypted when detecting that the key-value pair contains sensitive data (e.g., when the key-value pair is a password field). When the hashing and encryption handler 306 determines that the key-value pair is to be hashed and/or encrypted, the example hashing and encryption handler 306 hashes and/or encrypts the key-value value pair (block 520). Example computer readable instructions for hashing and/or encrypting the key-value pair are described in conjunction with FIG. 8.

After the example hashing and encryption handler 306 determines that hashing and encryption are not requested (block 518) or the hashing and encryption handler hashes and/or encrypts the key-value pair (block 520), the example compression handler 308 determines if the key-value pair is to be compressed (block 522). The compression handler 308 may determine that the key-value pair is to be compressed when the request to generate the object notation data indicates that the key-value pair is to be compressed. Alternatively, the example compression handler 308 may determine that the key-value pair is to be compressed when the size of the value exceeds a threshold level. When the compression handler 308 determines that the key-value pair is to be compressed, the example compression handler 308 compresses the key-value value pair (block 524). Example computer readable instructions for compressing the key-value pair are described in conjunction with FIG. 6.

After the example compression handler 308 determines compression is not requested (block 522) or the compression handler 308 compresses the key-value pair (block 524), the example serialization processor 310 determines if the key-value pair is to be serialized (block 526). The example serialization processor 310 may determine that the key-value pair is to be serialized when the request to generate the object notation data indicates that the key-value pair is to be serialized. When the serialization processor 310 determines that the key-value pair is to be serialized, the example serialization processor 310 serializes the key-value value pair (block 528). An example process for serializing the key-value pair is described in conjunction with FIG. 7.

After performing any requested hashing and/or encrypting (block 520), compressing (block 522), and serializing (block 528), the example data handler 302 inserts the generated key-value pair in the object notation data (e.g., an xJSON file) (block 530). The example data handler 302 determines if there are additional data objects and/or elements for which key-value pairs are to be generated (block 532). When there are additional objects and/or elements for key-value pair generation, control returns to block 510 to process the next object and/or element. When there are no additional objects and/or elements for key-value pair generation the example computer readable instructions of FIG. 5 end.

Figure 6:
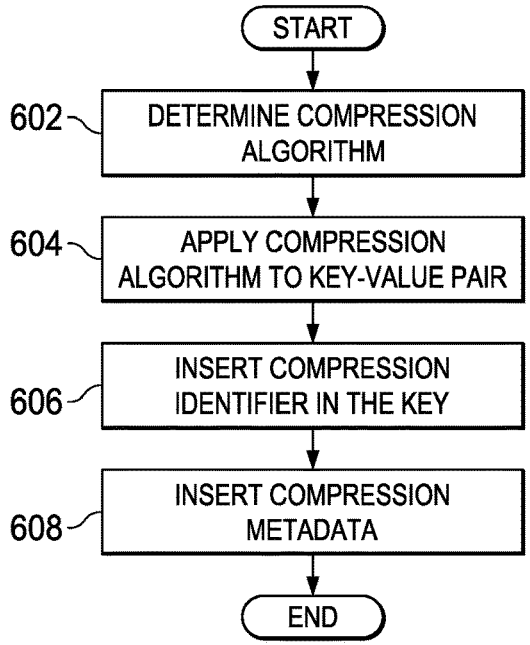

FIG. 6 is a flowchart of example computer readable instructions to compress a key-value pair. The example computer readable instructions of FIG. 6 may be used to implement block 524 of FIG. 5. The example computer readable instructions of FIG. 6 begins when the example compression handler 308 determines a compression algorithm (block 602). For example, a request to compress a key-value pair may specify a compression algorithm to be used. Alternatively, the example compression handler 308 may include a default compression algorithm (e.g., the gzip compression algorithm). The example compression handler 308 then compresses the key-value pair using the determined compression algorithm (block 604). The example compression handler 308 then inserts a compression identifier in the key for the key-value pair (block 606). For example, the compression identifier may be any indication that may indicate that the key-value pair is compressed (e.g., "[z]"). For example, a compressed key-value pair may include a key placeholder and the compression identifier (e.g., "_o1[z]" where the value following the "o" is an index that is incremented for each compressed value to ensure that each key remains unique). The example compression handler 308 then inserts metadata regarding the compression in the value for the key-value pair (block 608). For example, the compression handler 308 may insert an identification of the algorithm used for compression (e.g., "alg: gzip") and parameters for the compression (e.g., a lookup table "lut: +srRõ'ós"). The example computer readable instructions of FIG. 6 then end. For example, control may return to block 526 of FIG. 5.

Figure 7:
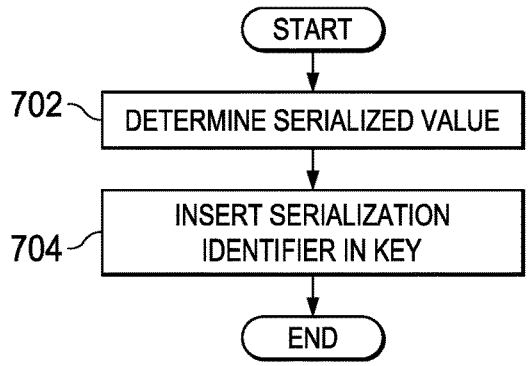

FIG. 7 is a flowchart of example computer readable instructions that may be executed to serialize a key-value pair. The example computer readable instructions of FIG. 7 may be used to implement block 528 of FIG. 5. The example computer readable instructions of FIG. 7 begins when the example serialization processor 310 determines a serialized value for the value in the key-value pair (block 702). For example, the serialization processor 310 may serialize the value of the key-value pair and perform a binary to text conversion (e.g., using Base64) to store the serialized data in the object notation data. The example serialization processor 310 then modifies the key of the key-value pair to insert a serialization identifier in the key (e.g., the example serialization processor 310 may insert "b" in the key). The example computer readable instructions of FIG. 7 then end. For example, control may return to block 530 of FIG. 5.

Figure 8:
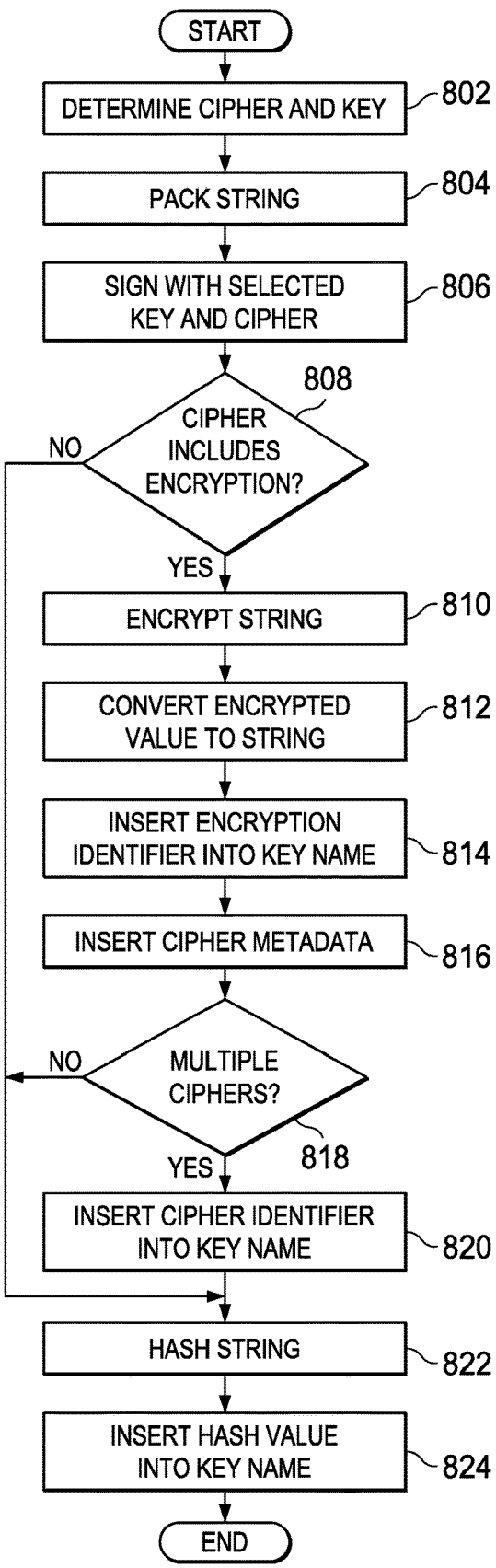

FIG. 8 is a flowchart of example computer readable instructions to hash and/or encrypt a key-value pair. The example computer readable instructions of FIG. 8 may be used to implement block 520 of FIG. 5. The process of FIG. 8 begins when the example hashing and encryption handler 310 of the illustrated example determines a cipher and a key to be used (block 802). For example a request to hash and/or encrypt may include an identification of a cipher and/or a key (e.g., a private key) that is to be used. Alternatively, the hashing and encryption handler 310 may utilize a default cipher and/or private key. The example hashing and encryption handler 310 then packs the string to be encrypted (block 804). For example, the example hashing and encryption handler 310 packs the key-value pair by removing any quotation marks. The hashing and encryption handler 310 may perform any other packing to remove any other characters. The example hashing and encryption handler 310 then signs the key-value pair using the identified key (block 806).

The example hashing and encryption handler 310 then determines if the cipher includes encryption (block 808). For example, the cipher may be a cipher that only includes hashing or may be a cipher that includes hashing and encryption. When the cipher does not include encryption, control proceeds to block 822 for hashing of the key-value pair. When the cipher includes encryption, the hashing and encryption handler 310 encrypts the signed key-value pair (block 810). The example hashing and encryption handler 310 then converts the encrypted value to a string for insertion in the xJSON file (block 812). The example hashing and encryption handler 310 transfers the encrypted value to a string using Base64 encoding.

After encrypting the key-value pair (block 810), the hashing and encryption handler 310 inserts an encryption identifier (e.g., "[s]") in the key of the key-value pair (block 814). The example hashing and encryption handler 310 then inserts the metadata identifying the cipher in the xJSON file (block 816). For example, the cipher metadata may be inserted in a key-value pair with key name "keys." The example hashing and encryption handler 310 then determines if there are multiple ciphers in the keys metadata (block 818). If there are multiple ciphers in the keys metadata, the example hashing and encryption handler 310 inserts a cipher identifier in the key of the encrypted key-value pair (block 820). For example, the hashing and encryption handler 310 may insert an index corresponding to the cipher in the keys metadata (e.g., "[s2]" where the cipher is the second cipher in the keys metadata).

After the hashing and encryption handler 310 has determined that the cipher does not include encryption (block 808), has determined that there are not multiple ciphers (block 818), or has inserted the identifier of the cipher in the key (block 820), the example hashing and encryption handler 310 determines a hash for the value of the key-value pair (block 822). For example, the hash may be determined using a double Pearson hashing. The example hashing and encryption handler 310 inserts the value of the hash into the key for the key-value pair (block 824). For example, the hash value may be inserted following a hashing identifier (e.g., the hashing identifier may be the hash symbol (#)). For example, the hash may be inserted as ("[#XXXX]" where XXXX is the hash value). A key for a value that is encrypted and hashed may be "[s#XXXX]" where a single cipher is present and "[s1#XXXX]" where there are multiple ciphers and the first cipher was utilized for the encryption.

The example computer readable instructions of FIG. 8 then end. For example, control may return to block 522 of FIG. 5.

While an example manner of implementing the parser 204 of FIG. 2 is illustrated in FIG. 4, one or more of the elements, processes and/or devices illustrated in FIG. 4 may be combined, divided, re-arranged, omitted, eliminated and/or implemented in any other way. Further, the example data handler 402, the example string processor 404, the example deserialization processor 406, the example decompression handler 408, the example decryption handler 410, and/or, more generally, the parser 204 of FIGS. 2 and 4 may be implemented by hardware, software, firmware and/or any combination of hardware, software and/or firmware. Thus, for example, any of the example data handler 402, the example string processor 404, the example deserialization processor 406, the example decompression handler 408, and/or the example decryption handler 410 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data handler 402, the example string processor 404, the example deserialization processor 406, the example decompression handler 408, and/or the example decryption handler 410 is/are hereby expressly defined to include a tangible computer readable storage device or storage disk such as a memory, a digital versatile disk (DVD), a compact disk (CD), a Blu-ray disk, etc. storing the software and/or firmware. Further still, the xJSON handler 110 of FIG. 1 and/or the parser 204 of FIGS. 2 and/or 4 may include one or more elements, processes and/or devices in addition to, or instead of, those illustrated in FIG. 4, and/or may include more than one of any or all of the illustrated elements, processes and devices.

Figure 9:
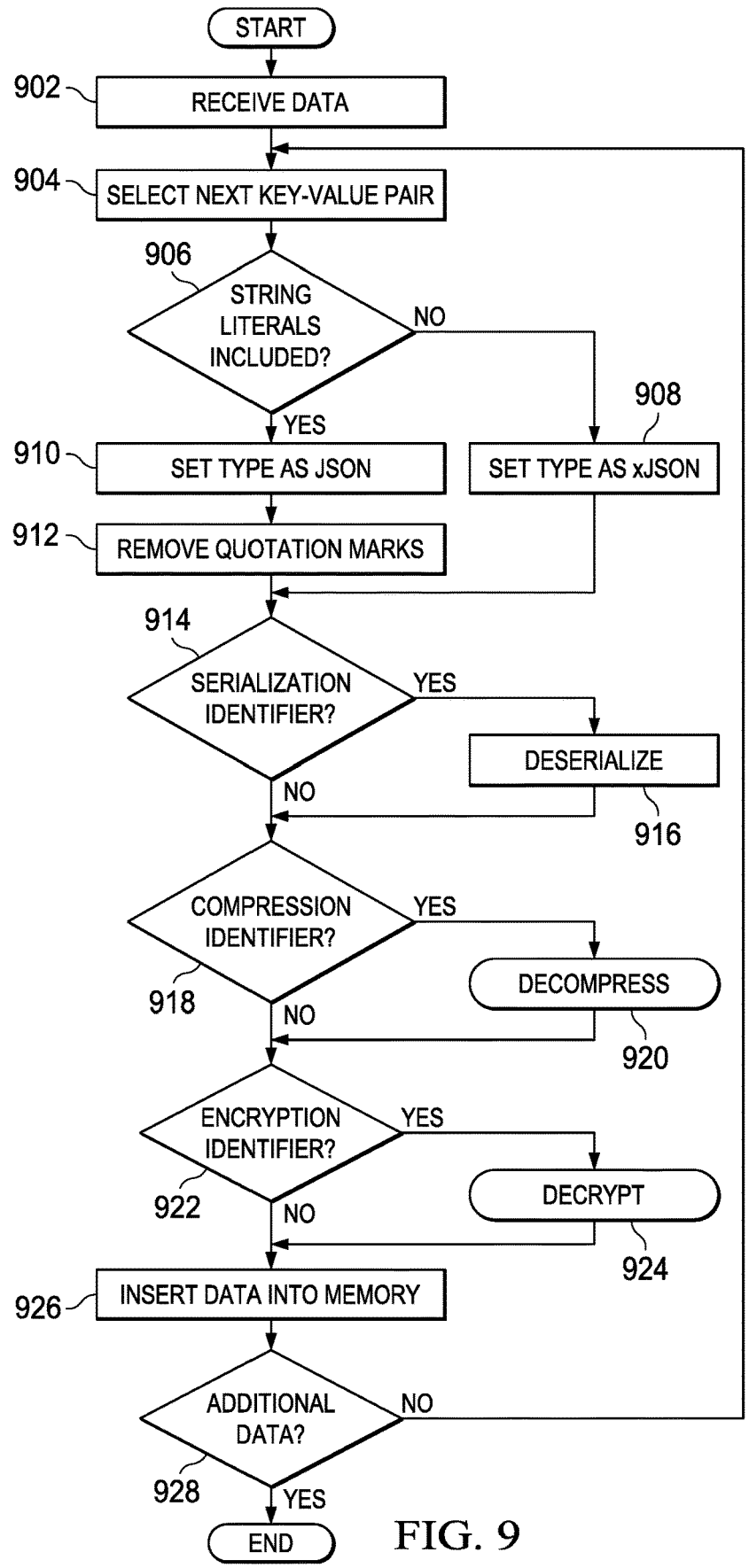
FIGS. 9-11 are flowcharts representative of an example computer readable instructions that which may be performed to parse extended JSON data.
Figure 10:
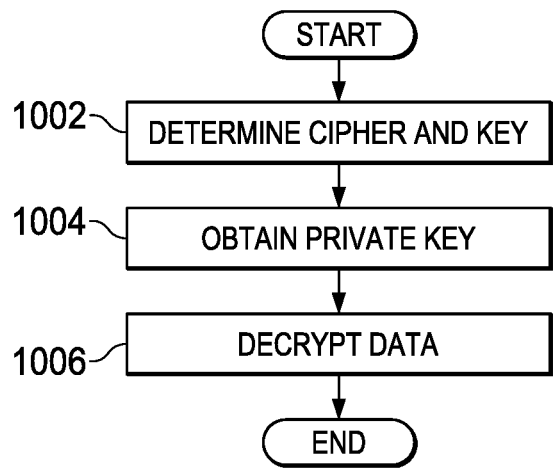
Figure 11:
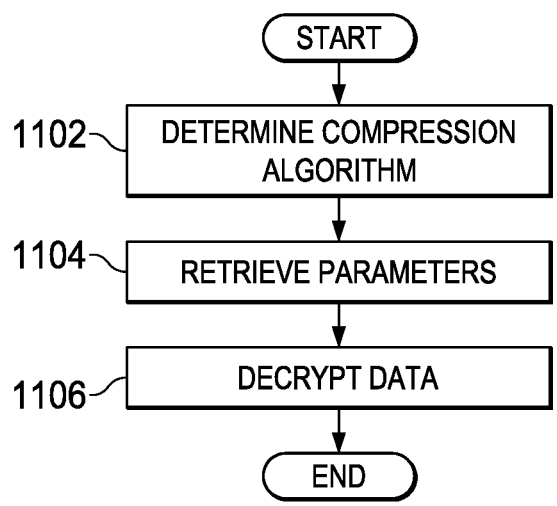

Flowcharts representative of example machine readable instructions for implementing the example parser 204 are shown in FIGS. 9-11. In these examples, the machine readable instructions comprise program(s) for execution by a processor such as the processor 1212 shown in the example processor platform(s) 1200 discussed below in connection with FIG. 12. The program(s) may be embodied in software stored on a tangible computer readable storage medium such as a CD-ROM, a floppy disk, a hard drive, a digital versatile disk (DVD), a Blu-ray disk, or a memory associated with the processor(s) 1212, but the entire program(s) and/or parts thereof could alternatively be executed by a device other than the processor(s) 1212 and/or embodied in firmware or dedicated hardware. Further, although the example program(s) are described with reference to the flowcharts illustrated in FIGS. 9-11, many other methods of implementing the example parser 204 may alternatively be used. For example, the order of execution of the blocks may be changed, and/or some of the blocks described may be changed, eliminated, or combined.

As mentioned above, the example processes of FIGS. 9-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 9-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 9 is a flowchart of example computer readable instructions for the example parser 204 to parse object notation data (e.g., an xJSON file). The example computer readable instructions of FIG. 9 begin when the example data handler 402 receives object notation data (block 902). For example the data handler 402 or another component of a device including the xJSON handler 110 may request data from another device that transmits data as xJSON data.

In some examples, the data handler 402 of the illustrated example requests only a portion of an available object notation data. For example, an example xJSON file might include 100,000 key value pairs, which would exhaust the memory of a low power device (e.g., and IoT device) attempting to parse the xJSON file. Accordingly, the example data handler 402 requests a desired portion (e.g., based on a request for retrieving data). For example, the data handler 402 may reference a particular portion of the object notation data using dot notation (e.g., "@example.com/myobj.xjson#id.value1" would retrieve the key identified as value1 in the object id in the myobj.xjson file served by example.com). Thus, the example data handler 402 may retrieve a desired key(s) and/or object(s) of interest without the need to retrieve the entire object notation data. In an example implementation, an object may be referenced as "#object" where "object" is the name of the object, "@uri" where "uri" is the location from which the object notation data may be retrieved, and @uri#object.subobject where "subobject" identifies an object and/or key within the object "object" in the object notation data location at "uri."

The example data handler 402 selects the first key-value pair in the object notation data (block 904). The example string processor 404 determines if the key-value pair includes string literals (e.g., quotation marks) (block 906). When the key-value pair does not include string literals, the example string processor 404 determines that the received file is of the xJSON type and stores an indication that the file is an xJSON file (e.g., because JSON files include the quotation marks but xJSON files not need to include the quotation marks) (block 908). Control then proceeds to block 922.

When the string processor 404 determines that the key-value pair includes string literals, the string processor 404 stores the type as JSON (block 910). For example, the file may be a JSON compatible file because it includes the string literals, but the file may include xJSON extensions. The example string processor 404 then removes the quotation marks from the key-value pair to reduce the size of the xJSON file (block 912).

After the string processor 404 sets the type as xJSON (block 908) or after the string processor 404 removes the quotation marks (block 912), the example deserialization processor 406 determines if the key includes a serialization identifier (block 914). When the key includes a serialization identifier, the example deserialization processor 406 deserializes/demarshalls the serialized data (block 916).

When the key-value pair does not include a serialization identifier (block 914) or after deserialization of the key-value pair (block 916), the example decompression handler 408 determines if the key includes a compression identifier (block 918). When the key includes a compression identifier, the example decompression handler 408 decompresses the key-value pair (block 920). Example computer readable instructions that may be executed to decompress a key-value pair is described in conjunction with FIG. 11.

When the key-value pair does not include a compression identifier identifier (block 918) or after decompression of the key-value pair (block 920), the example decryption handler 410 determines if the key of the key-value pair includes an encryption identifier (block 922). When the key includes the encryption identifier, the decryption handler 410 decrypts the key-value pair (block 924). Example computer readable instructions to decrypt the key-value pair are described in conjunction with FIG. 10.

FIG. 10 is a flowchart of example computer readable instructions to decrypt and encrypted key-value pair. The example computer readable instructions may be used to implement block 924 of FIG. 9. The example computer readable instructions begin when the decryption handler 410 determines the cipher and key utilized during encryption of the key-value pair (block 1002). The example decryption handler 410 determines the cipher and public key from the keys metadata included in object notation data. In some examples, the decryption handler 410 selects the cipher and key from a list of keys using an index identified in the encryption handler.

The example decryption handler 410 then obtains the private key corresponding to the public key used during encryption (block 1004). For example, the private key may be stored in a set of private keys stored in the parser 204. Alternatively, the decryption handler 410 may display a prompt requesting that a user provide a private key corresponding to an identified public key. The decryption handler 410 then decrypts the encrypted data using the private key and the identified cipher (block 1006). The example computer readable instructions of FIG. 10 then end. For example, control may return to block 926 of FIG. 9.

FIG. 11 is a flowchart of example computer readable instructions to decompress a key-value pair. The example computer readable instructions of FIG. 11 may be used to implement block 920 of FIG. 9. The example computer readable instructions of FIG. 11 begin when the example decompression handler 408 determines a compression algorithm that was utilized to compress the key-value pair (block 1102). For example, the decompression handler 408 determines the compression algorithm from the metadata inserted in value of the compressed key-value pair. The example decompression handler 408 then determines parameters for the compression (block 1104). For example, the decompression handler 408 may extract the parameters from metadata inserted in the value of the key-value pair. For example, the parameters may include a look-up table utilized by the compression algorithm. The example decompression handler 408 then decrypts the key-value pair using the identified compression algorithm and the parameters (block 1106). The example computer readable instructions of FIG. 11 then end. For example, control may return to block 922 of FIG. 9.

Figure 12:
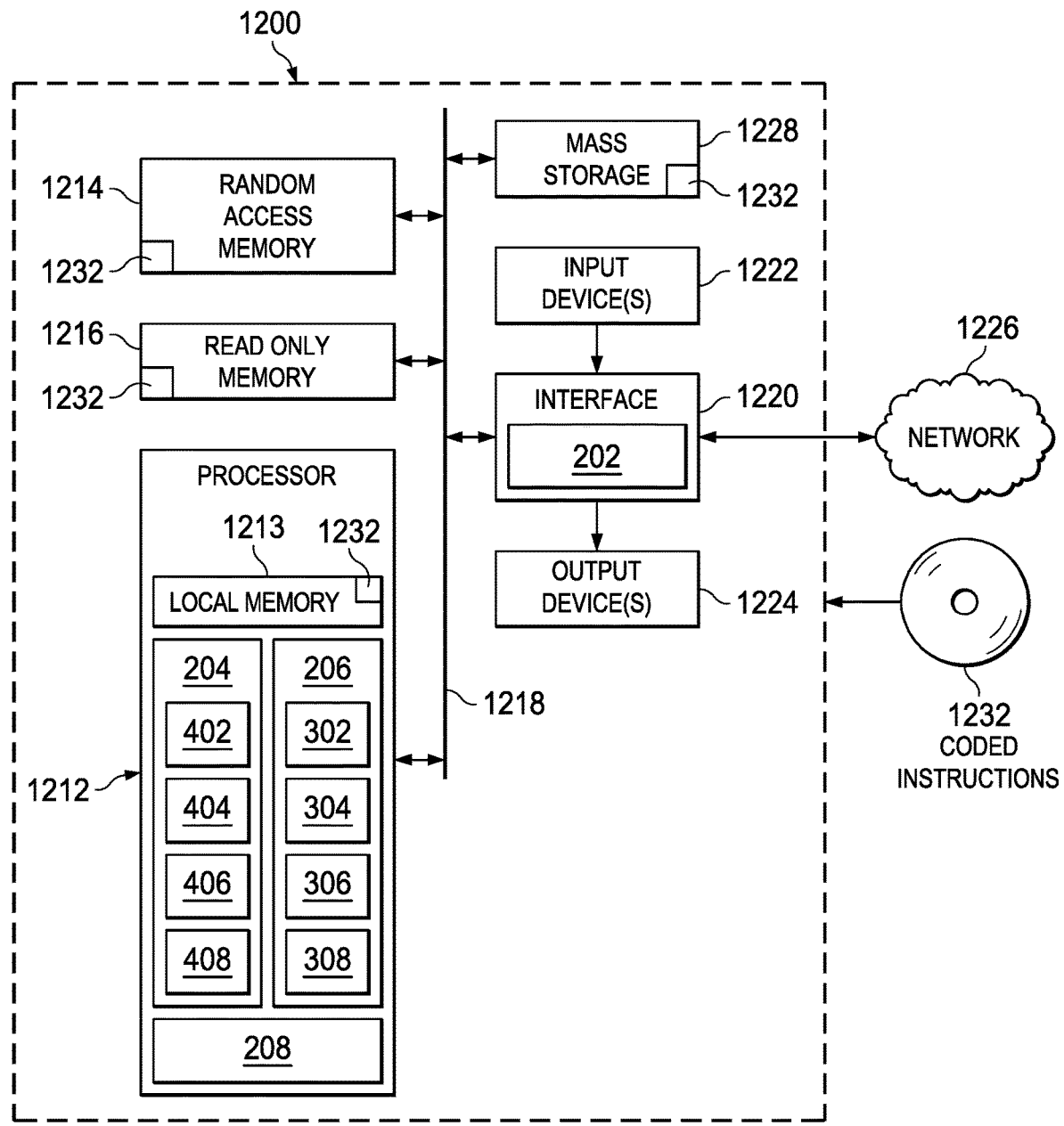
FIG. 12 is a block diagram of an example processor platform structured to execute the instructions of FIGS. 5-11 to implement the generator and/or the example parser of FIGS. 2-4.

FIG. 12 is a block diagram of an example processor platform 1200 structured to execute the instructions of FIGS. 5, 6, 7, 8, 9, 10, and/or 11 to implement the example first device 106 and/or the example web service 102 including the example interface 202, the example parser 204 (e.g., including the example data handler 402, the example string processor 404, the example deserialization processor 406, the example decompression handler 408, and/or the example decryption handler 410), the example generator 206 (e.g., including the example data handler 302, the example string processor 304, the example hashing and encryption handler 306, the example compression handler 308, and/or the example serialization processor 310), and/or the example JavaScript interpreter 210. The processor platform 1200 can be, for example, a personal computer, a mobile device (e.g., a cell phone, a smart phone, a tablet such as an iPad™), a personal digital assistant (PDA), or any other type of computing device capable of processing images.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The example processor 1212 of FIG. 12 may implement the components of the example xJSON handler 110 including the example parser 204, the example generator 206, and the example JavaScript interpreter 208 to parse and generate xJSON files and data.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface. The example interface circuit may implement the example interface 202 of the xJSON handler 110 of FIGS. 1 and/or 2 to interface the processor platform 1200 with the example network 104 of FIG. 1.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 5, 6, 7, 8, 9, 10, and/or 11 may be stored in the mass storage device 1228, in the volatile memory 1214, in the non-volatile memory 1216, and/or on a removable tangible computer readable storage medium such as a CD or DVD.

Examples disclosed herein provide extensions to object notation data (e.g., human-readable object notation data such as JSON). In some examples, usage of data storage and communication bandwidth are reduced used by packing and/or compressing portions of the object notation data. In some examples, computer processing resource usage is reduced by allowing portions of object notation data to be packed/compressed, serialized, and/or compressed while allowing other portions of the object notation data not to be extended. For example, in a JSON file, using examples disclosed herein, a single key-value pair can be encrypted without requiring the entire JSON file to be encrypted, which reduces the amount of processing required to encrypt and decrypt the elements of the JSON file. In some examples, backward compatibility with devices that do not support the extension is provided by generating output (e.g., extended JSON files) that follow grammar rules set by prior object notation protocols. Accordingly, such extended files that meet the grammar rules of the prior protocol will not trigger errors when parsing the extended files with a device that does not support the extensions.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A process of producing an extended JavaScript Notation file comprising:
   (a) determining a cipher and a key to be used in at least one of hashing and encrypting a JavaScript Object Notation (JSON) key-value pair;
   (b) signing the key-value pair using the determined key;
   (c) encrypting the signed key-value pair when the cipher includes encryption;
   (d) converting the encrypted key-value pair to a string for insertion in an extended JavaScript Object Notation file;
   (e) inserting an encryption identifier in the key of the key-value pair;
   (f) inserting metadata identifying the cipher in the xJSON file;
   (g) determining a hash for the value of the key-value pair and hashing the key-value pair; and
   (h) inserting the value of the hash into the key for the key-value.

2. The process of claim 1 in which determining a cipher includes determining whether the cipher includes encryption, hashing, or hashing and encryption.

3. The process of claim 1 in which determining a cipher includes determining whether the cipher includes encryption, hashing or hashing and encryption and when the cipher does not include encryption, proceeding to determining a hash for the value of the key-value pair.

4. The process of claim 1 in which the converting includes transferring the encrypted value to a string using Base64 encoding.

5. The process of claim 1 in which the inserting an encryption identifier in the key of the key-value pair includes inserting an identifier "[s]" in the key.

6. The process of claim 1 in which the inserting metadata includes inserting the metadata in a key-value pair with key name "keys".

7. The process of claim 1 including determining whether there are multiple ciphers in the keys metadata.

8. The process of claim 1 including determining whether there are multiple ciphers in the keys metadata and if there are multiple ciphers in the keys metadata, inserting a cipher identifier in the key of the encrypted key-value pair.

9. The process of claim 1 in which inserting metadata includes inserting an index corresponding to the cipher in the keys metadata.

10. The process of claim 1 in which inserting metadata includes inserting an index "[s2]" corresponding to the cipher in the keys metadata, where the cipher is the second cipher in the keys metadata.

11. The process of claim 1 in which determining a hash for the value of the key-value pair and hashing the key-value pair occurs after determining that the cipher does not include encryption, after determining that there are not multiple ciphers, or after inserting the identifier of the cipher in the key.

12. The process of claim 1 including receiving a request to hash and/or encrypt that includes an identification of a cipher, a key, or a private key.

13. Extended JavaScript Object Notation generator circuitry comprising:
   (a) data handler circuitry having a first input receiving object data, a second input, and a file output, the data handler circuitry records the content type for an extended JavaScript Object Notation (xJSON) file, creates a key-value pair for the object data, by creating a key named for the variable of the object data and creating a corresponding value for the value of the variable, and sends and the key-value pair to the output;
   (b) string processor circuitry having an input coupled to the file output and an output, the string processor circuitry processing the object notation data to be parsed by xJSON capable devices; and
   (c) hashing and encryption handler circuitry having an input coupled to the output of the string processor circuitry and an output coupled to the second input of the data handler circuitry, the hashing and encryption handler circuitry:
      (i) determining a cipher and a key to be used in at least one of hashing and encrypting a JavaScript Object Notation (JSON) key-value pair;
      (ii) signing the key-value pair using the determined key;
      (iii) encrypting the signed key-value pair when the cipher includes encryption;
      (iv) converting the encrypted key-value pair to a string for insertion in an extended JavaScript Object Notation file;
      (v) inserting an encryption identifier in the key of the key-value pair;
      (vi) inserting metadata identifying the cipher in the xJSON file;
      (vii) determining a hash for the value of the key-value pair and hashing the key-value pair; and
      (viii) inserting the value of the hash into the key for the key-value.

14. The extended JavaScript Object Notation generator circuitry of claim 13 in which the hashing and encryption handler circuitry determines whether the cipher includes encryption, hashing, or hashing and encryption.

15. The extended JavaScript Object Notation generator circuitry of claim 13 in which the hashing and encryption handler circuitry determines whether the cipher includes encryption, hashing or hashing and encryption and when the cipher does not include encryption, proceeding to determining a hash for the value of the key-value pair.

16. The extended JavaScript Object Notation generator circuitry of claim 13 in which the hashing and encryption handler circuitry transfers the encrypted value to a string using Base64 encoding.

17. The extended JavaScript Object Notation generator circuitry of claim 13 in which the hashing and encryption handler circuitry inserts an encryption identifier in the key of the key-value pair by inserting an identifier "[s]" in the key.

18. The extended JavaScript Object Notation generator circuitry of claim 13 in which the hashing and encryption handler circuitry inserts the metadata in a key-value pair with key name "keys".

19. The extended JavaScript Object Notation generator circuitry of claim 13 in which the hashing and encryption handler circuitry determines whether there are multiple ciphers in the keys metadata.

20. The extended JavaScript Object Notation generator circuitry of claim 13 in which the hashing and encryption handler circuitry determines whether there are multiple ciphers in the keys metadata and if there are multiple ciphers in the keys metadata, inserts a cipher identifier in the key of the encrypted key-value pair.

\* \* \* \* \*